United States Patent [19]
Johnson et al.

[11] Patent Number: 5,363,719
[45] Date of Patent: Nov. 15, 1994

[54] MECHANICAL CONTROL CABLE SYSTEM HAVING AN UMBRELLA SEAL

[75] Inventors: Jerry L. Johnson; Vincent L. Perko; Melanee J. Williams, all of Flagstaff, Ariz.

[73] Assignee: W. L. Gore & Associates, Inc., Newark, Del.

[21] Appl. No.: 29,261

[22] Filed: Mar. 10, 1993

[51] Int. Cl.$^5$ .............................................. F16C 1/10
[52] U.S. Cl. ................... 74/502.4; 74/502.6
[58] Field of Search ............ 74/500.5, 501.5 R, 502.4, 74/502, 502.6

[56] References Cited

U.S. PATENT DOCUMENTS

| | | | |
|---|---|---|---|
| 4,099,425 | 7/1978 | Moore | 74/502.5 |
| 4,157,602 | 6/1979 | Pennell | 74/502.4 |
| 4,304,148 | 12/1981 | Hamman | 74/501.5 R |
| 4,304,149 | 12/1981 | Heimann | 74/501.5 R |
| 4,534,239 | 8/1985 | Heimann | 74/501.5 R |
| 4,541,303 | 9/1985 | Kuzunishi | 74/502.5 |
| 4,773,279 | 12/1988 | Spease et al. | 74/502.4 |
| 4,903,541 | 2/1990 | Shiota | 74/501.5 R |
| 5,039,138 | 8/1991 | Dickirson | 74/502.6 |
| 5,079,967 | 1/1992 | Lacava | 74/501.5 R |
| 5,138,898 | 8/1992 | Pospisil et al. | 74/502.6 |
| 5,172,878 | 12/1992 | Lederman | 74/502.4 X |
| 5,199,320 | 4/1993 | Spease et al. | 74/502.4 |
| 5,207,116 | 5/1993 | Sultze | 74/500.5 |

FOREIGN PATENT DOCUMENTS

| | | | |
|---|---|---|---|
| 0460839 | 12/1991 | European Pat. Off. | 74/502.6 |
| 2398914 | 2/1979 | France | 74/502.4 |
| 4-29609 | 1/1992 | Japan | 74/502.6 |

*Primary Examiner*—Vinh T. Luong
*Attorney, Agent, or Firm*—Wayne D. House

[57] ABSTRACT

A mechanical control cable system having a tubular housing coaxially surrounding a portion of a length of control cable and incorporating a tubular umbrella seal affixed to at least one end of the system. The tubular umbrella seal is coaxially affixed at one end to an exposed end of the control cable; the other end of the tubular umbrella seal coaxially surrounds an end of the tubular housing with coaxial clearance adequate to allow the tubular umbrella seal to move axially with respect to the tubular housing over the entire desired range of axial motion.

30 Claims, 2 Drawing Sheets

MECHANICAL CONTROL CABLE SYSTEM HAVING AN UMBRELLA SEAL

FIELD OF THE INVENTION

The present invention relates to the field of mechanical control systems having sealed tubular housings.

BACKGROUND OF THE INVENTION

A common problem with mechanical control cables is friction and wear resulting from the ingress of contamination into the annular space between the cable and the coaxially surrounding housing. A common solution to the problem is to provide a scraper-type seal at each end of the housing wherein a scraper component slides axially against the moving surface of the cable. Scraper seals increase the friction of the cable system and also may require that the cables have a smooth outer plastic jacket so that a smooth and effective sealing surface is provided and so that the scraper seal is not quickly worn out.

SUMMARY OF THE INVENTION

The present invention is a mechanical control cable system having a tubular housing coaxially surrounding a portion of a length of control cable and incorporating a tubular umbrella seal at one or both ends of the system. The tubular umbrella seal is coaxially affixed at one end to the control cable; the other end of the tubular umbrella seal coaxially surrounds the adjacent end of the tubular housing with coaxial clearance adequate to allow axial motion between the cable and housing over the desired range. Because one end of the tubular umbrella seal surrounds the end of the cable housing, it is necessary to attach the housing to a surface or object at a location on the housing beyond the portion of the housing end surrounded by the tubular umbrella seal at the maximum point of cable insertion into the housing.

In a preferred embodiment, the mechanical control cable system incorporates a tubular metal housing having a polymeric tubular liner closely fitted within the housing. The ends of the tubular liner extend beyond the ends of the tubular housing by an amount at least equal to the desired length of axial motion between the cable and housing. The tubular umbrella seal is coaxially attached at one end to the control cable while the opposite end coaxially surrounds the polymeric tubular liner extending beyond the end of the tubular housing.

DETAILED DESCRIPTION OF THE INVENTION

Figure 1:
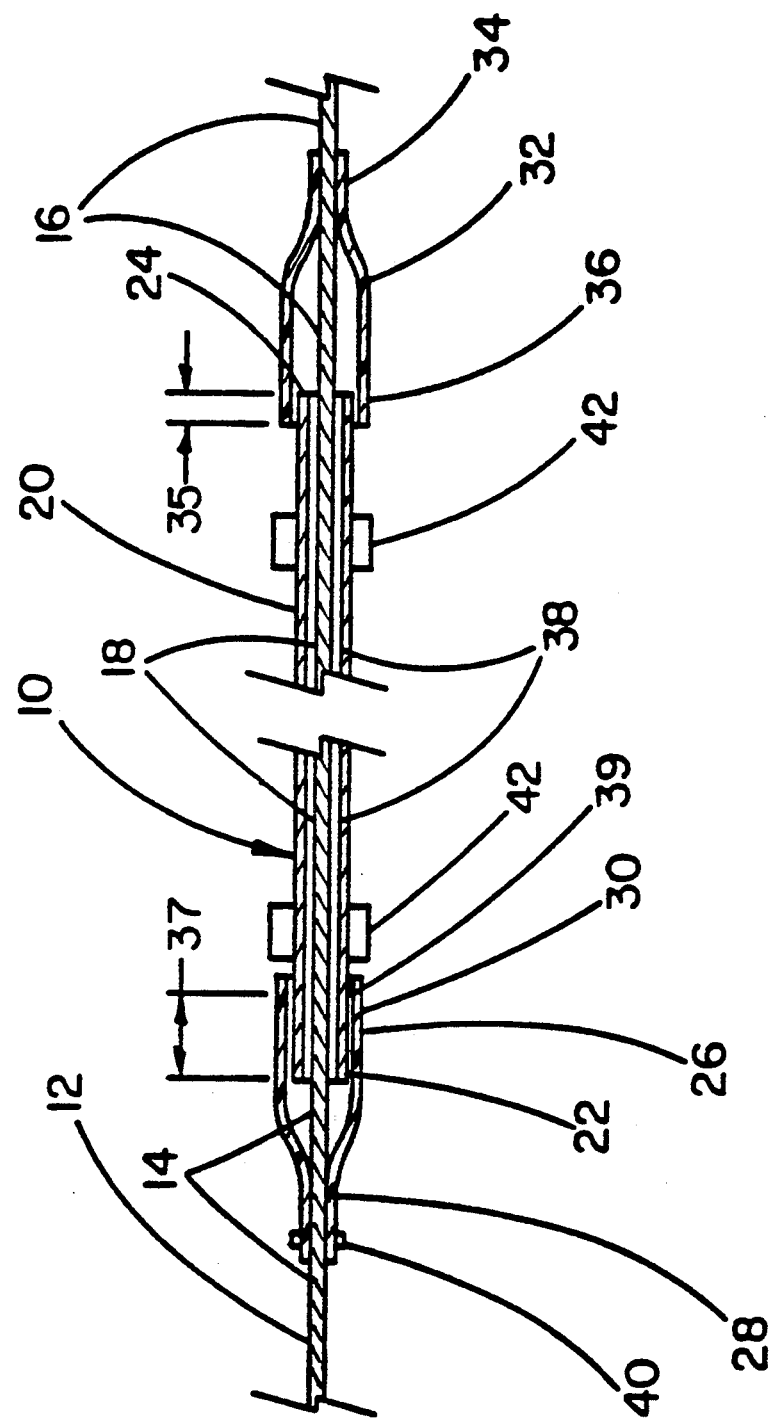
FIG. 1 shows a cross sectional view of the mechanical control cable system of the present invention incorporating a tubular umbrella seal at both ends of the system.

FIG. 1 shows a cross sectional view of the mechanical control cable system 10 of the present invention incorporating a tubular umbrella seal 26 affixed to at least one end of the system. The mechanical control cable system 10 is shown in a straight configuration for convenience; it is acknowledged that these systems normally include at least one significant curve within their total length during conventional use. The system 10 includes a conventional control cable 12 coaxially surrounded by a tubular housing 20. The tubular housing is preferably of wound metal wire construction and may optionally include a polymeric tubular liner. Likewise, the cable may optionally be provided with a polymeric covering. The use of an optional polymeric tubular liner for the tubular housing and the optional polymeric covering for the cable are well known in the art of mechanical control cables.

Control cable 12 has a middle portion 18 that is coaxially surrounded by the tubular housing 20; the first exposed end 14 and second exposed end 16 of control cable 12 are exposed beyond the first end 22 and second end 24 respectively of the tubular housing 20. Annular clearance 38 between the control cable 12 and the inner surface of the tubular housing 20 allows for relatively free axial travel of the control cable 12 with respect to the tubular housing 20 during normal operation. A tubular umbrella seal 26 is affixed at a first end 28 of the seal to the first exposed end 14 of cable 12. A second end 30 of the tubular umbrella seal 26 is of adequate length and inside diameter to coaxially surround the first end 22 of tubular housing 20. The inside diameter of the second end 30 of the tubular umbrella seal 26 should provide for a slight amount of operating clearance 39 around the outside of the first end 22 of the tubular housing 20. The length of this second end 30 of the tubular umbrella seal 26 should be slightly more than the operating length 37 of the mechanical control cable system 10. This operating length 37 is the axial distance the cable 12 travels during normal operation with respect to the housing 20.

The mechanical control cable system 10 may optionally be provided with a second tubular umbrella seal 32 affixed to the second exposed end 16 of control cable 12.

FIG. 1 shows the mechanical control cable system 10 with cable 12 fully extended with respect to the tubular housing 20 in the direction of the second end 24 of the tubular housing 20. In this configuration the second end 36 of the second tubular umbrella seal 32 coaxially surrounds only a short length 35 of the second end 24 of tubular housing 20. This short length 35 should be adequate to provide a reasonably good contamination seal and should be at least about 1–2 mm and more preferably at least about 4–5 mm. The first tubular umbrella seal 26 is shown at its closest proximity to the first end 22 of the tubular housing 20. The first end 22 is coaxially surrounded by the second end 30 of the first tubular umbrella seal 26 for a distance corresponding to the normal operating length 37 of the system 10 plus the short length 35.

The mechanical control cable system 10 is attached to any appropriate surface or object, such as a bicycle frame, by clamps 42 attached to and located near the first end 22 and second end 24 of the tubular housing 20. The clamps 42 can be no closer to the actual end of the tubular housing 20 than the distance corresponding to the combined normal operating length 37 plus the short length 35 in order to allow for travel of the tubular umbrella seal 26 with control cable 12.

The tubular umbrella seal may be affixed to the control cable 12 by a suitable clamp 40 as shown by the first end 28 of the first tubular umbrella seal 26,. Clamp 40 may also be a component with an additional function, such as an actuator clamped to the cable at the same point as the first end 28 of the tubular umbrella seal 26.

Alternatively the tubular umbrella seal may be secured to the cable 12 by an adequate interference fit as shown by the first end 34 of the second tubular umbrella seal 32.

The tubular umbrella seal may be made of any suitable material that allows it to provide an effective sealing function over the life of the mechanical control cable system 10. While suitable materials include metals, it is believed that preferred materials are formed polymers offering good flexibility, low coefficient of friction and shape memory. Polymers such as polyethylene, polypropylene and polyvinyl chloride are believed to be suitable; fluoropolymers such as fluorinated ethylene propylene, PTFE and perfluoroalkoxy are believed to be preferable because of their low friction characteristics. Heat shrink tubings, preferably of PTFE, may also be appropriate if the relative diameters of the cable and housing allow the first end of the tubular umbrella seal to shrink adequately to adhere to the control cable.

Figure 2:
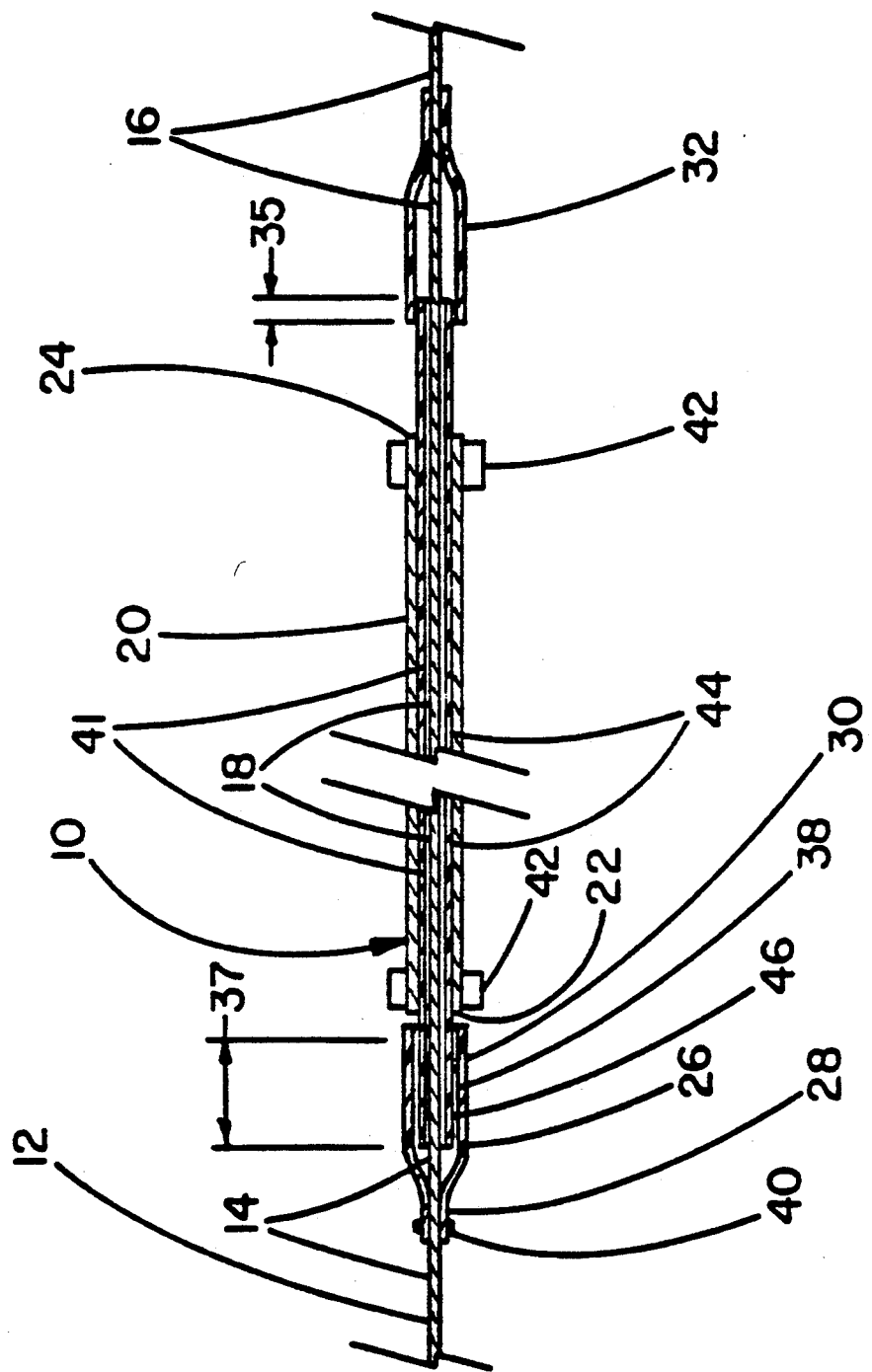
FIG. 2 shows a cross sectional view of a second preferred embodiment of the present invention wherein the tubular housing has an internal polymeric liner that extends beyond the ends of the tubular housing.

FIG. 2 shows a cross sectional view of a preferred embodiment of the mechanical control cable system 10 of the present invention. According to this embodiment the tubular housing 20 is provided with a polymeric tubular liner 44 wherein the first end 46 of the tubular liner 44 extends beyond the first end 22 of the tubular housing 20. Annular operating clearance 41 is provided between the control cable 12 and the inner surface of the polymeric tubular liner 44. The first tubular umbrella seal 26 coaxially surrounds only first end 46 of the tubular liner 44 and does not surround the first end 22 of the tubular housing 20. Instead, the second end 30 of the first tubular umbrella seal 26 may extend up to the first end 22 of the tubular housing 20 during normal operation of the system 10.

We claim:

1. A mechanical control cable system comprising:
   a) a length of flexible cable having first and second ends and having a middle portion disposed between the first and seconds ends;
   b) a length of tubular housing having first and second ends, wherein said length of tubular housing is shorter than said length of flexible cable and wherein said length of tubular housing coaxially surrounds the middle portion of the length of flexible cable, whereby the first and second ends of the length of flexible cable are first and second exposed ends extending beyond the first and second ends of the length of tubular housing; and
   c) a first tubular umbrella seal having first and second ends, wherein the first end of the first tubular umbrella seal is coaxially and rigidly affixed to the first exposed end of the length of flexible cable and the second end of the first tubular umbrella seal coaxially surrounds the first end of the length of tubular housing with sufficient clearance to allow for a desired amount of axial movement between the length of tubular housing and the length of flexible cable.

2. A mechanical control cable system according to claim 1 incorporating a second tubular umbrella seal having first and second ends, wherein the first end of the second tubular umbrella seal is coaxially affixed to the second exposed end of the length of flexible cable and the second end of the second tubular umbrella seal coaxially surrounds the second end of the length of tubular housing with sufficient clearance to allow for a desired amount of axial movement between the length of tubular housing and the length of flexible cable.

3. A mechanical control cable system according to claim 1 wherein the tubular housing is a wound metal tubular housing.

4. A mechanical control cable system according to claim 2 wherein the tubular housing is a wound metal tubular housing.

5. A mechanical control cable system according to claim 3 wherein the tubular housing incorporates a tubular polymeric liner fitted within the tubular housing.

6. A mechanical control cable system according to claim 4 wherein the tubular housing incorporates a tubular polymeric liner fitted within the tubular housing.

7. A mechanical control cable system according to claim 1 wherein the first tubular umbrella seal is comprised of metal.

8. A mechanical control cable system according to claim 2 wherein the first tubular umbrella seal is comprised of metal.

9. A mechanical control cable system according to claim 1 wherein the first tubular umbrella seal is comprised of a polymeric material.

10. A mechanical control cable system according to claim 2 wherein the first tubular umbrella seal is comprised of a polymeric material.

11. A mechanical control cable system according to claim 9 wherein the polymeric material is a heat shrink tubing.

12. A mechanical control cable system according to claim 10 wherein the polymeric material is a heat shrink tubing.

13. A mechanical control cable system according to claim 9 wherein the polymer is a fluoropolymer.

14. A mechanical control cable system according to claim 10 wherein the polymer is a fluoropolymer.

15. A mechanical control cable system according to claim 13 wherein the fluoropolymer is chosen from the group consisting of polytetrafluoroethylene, fluorinated ethylene propylene and perfluoroalkoxy.

16. A mechanical control cable system according to claim 14 wherein the fluoropolymer is chosen from the group consisting of polytetrafluoroethylene, fluorinated ethylene propylene and perfluoroalkoxy.

17. A mechanical control cable system comprising:
   a) a length of flexible cable having first and second ends and having a middle portion disposed between the first and seconds ends;
   b) a length of tubular housing having first and second ends, wherein said length of tubular housing is shorter than said length of flexible cable and wherein said length of tubular housing coaxially surrounds the middle portion of the length of flexible cable, wherein the tubular housing incorporates a tubular polymeric liner fitted within the tubular housing and wherein the first and seconds ends of the tubular polymeric liner extend beyond the first and second ends respectively of the tubular housing, whereby the first and second ends of the length of flexible cable are first and second exposed ends extending beyond the first and second ends of the length of tubular polymeric liner; and
   c) a first tubular umbrella seal having first and second ends, wherein the first end of the first tubular umbrella seal is coaxially and rigidly affixed to the first exposed end of the length of flexible cable and the second end of the first tubular umbrella seal coaxially surrounds the first end of the length of tubular polymeric liner with sufficient clearance to allow for a desired amount of axial movement between the length of tubular housing and the length of flexible cable.

18. A mechanical control cable system according to claim 17 incorporating a second tubular umbrella seal having first and second ends, wherein the first end of the second tubular umbrella seal is coaxially affixed to the second exposed end of the length of flexible cable and the second end of the second tubular umbrella seal coaxially surrounds the second end of the length of tubular polymeric liner with sufficient clearance to allow for a desired amount of axial movement between the length of tubular housing and the length of flexible cable.

19. A mechanical control cable system according to claim 17 wherein the tubular housing is a wound metal tubular housing.

20. A mechanical control cable system according to claim 18 wherein the tubular housing is a wound metal tubular housing.

21. A mechanical control cable system according to claim 17 wherein the first tubular umbrella seal is comprised of metal.

22. A mechanical control cable system according to claim 18 wherein the first tubular umbrella seal is comprised of metal.

23. A mechanical control cable system according to claim 17 wherein the first tubular umbrella seal is comprised of a polymeric material.

24. A mechanical control cable system according to claim 18 wherein the first tubular umbrella seal is comprised of a polymeric material.

25. A mechanical control cable system according to claim 23 wherein the polymeric material is a heat shrink tubing.

26. A mechanical control cable system according to claim 24 wherein the polymeric material is a heat shrink tubing.

27. A mechanical control cable system according to claim 23 wherein the polymer is a fluoropolymer.

28. A mechanical control cable system according to claim 24 wherein the polymer is a fluoropolymer.

29. A mechanical control cable system according to claim 27 wherein the fluoropolymer is chosen from the group consisting of polytetrafluoroethylene, fluorinated ethylene propylene and perfluoroalkoxy.

30. A mechanical control cable system according to claim 28 wherein the fluoropolymer is chosen from the group consisting of polytetrafluoroethylene, fluorinated ethylene propylene and perfluoroalkoxy.

* * * * *